United States Patent
Tseng (10) Patent No.: US 10,434,594 B2
(45) Date of Patent: Oct. 8, 2019

(54) IGNITION FLUX FOR ARC STUD WELDING AND ARC STUD WELDING METHOD

(71) Applicant: NATIONAL PINGTUNG UNIVERSITY OF SCIENCE & TECHNOLOGY, Pingtung County (TW)

(72) Inventor: Kuang-Hung Tseng, Pingtung County (TW)

(73) Assignee: NATIONAL PINGTUNG UNIVERSITY OF SCIENCE & TECHNOLOGY, Pingtung County (TW)

( * ) Notice: Subject to any disclaimer, the term of this patent is extended or adjusted under 35 U.S.C. 154(b) by 686 days.

(21) Appl. No.: 15/157,251

(22) Filed: May 17, 2016

(65) Prior Publication Data

US 2017/0266748 A1 Sep. 21, 2017

(30) Foreign Application Priority Data

Mar. 17, 2016 (TW) .............................. 105108316 A (51) Int. Cl.
B23K 9/20 (2006.01)
B23K 35/362 (2006.01)

(52) U.S. Cl.
CPC .............. *B23K 9/20* (2013.01); *B23K 35/362* (2013.01)

(58) Field of Classification Search
CPC ......... B23K 9/20; B23K 9/067; B23K 9/1006
USPC .......... 219/73.1, 98, 99, 145.22, 146.1, 158
See application file for complete search history.

(56) References Cited

U.S. PATENT DOCUMENTS

| 2,985,744 A * | 5/1961 | Van Den Blink | B23K 9/208 219/99 |
| 4,681,998 A * | 7/1987 | Kon | B23K 9/202 219/72 |
| 2014/0312008 A1* | 10/2014 | Workman | B23K 9/20 219/99 |

FOREIGN PATENT DOCUMENTS

| CN | 1102609 A | * | 5/1995 |
| JP | S4617565 | | 5/1971 |
| JP | S6099486 A | | 6/1985 |
| JP | S61111781 A | | 5/1986 |
| JP | S63295068 A | | 12/1988 |
| JP | H09108859 A | | 4/1997 |

(Continued)

OTHER PUBLICATIONS

"Properties of Atoms, Radicals and Bonds" T. L. Cottrell, The Strengths of Chemical Bonds, 2d ed., Butterworth, London, 1958. Downloaded on Jan. 8, 2019 from https://labs.chem.ucsb.edu/zakarian/armen/11---bonddissociationenergy.pdf.*

(Continued)

*Primary Examiner* — Thien S Tran
(74) *Attorney, Agent, or Firm* — WPAT, PC (57) ABSTRACT

The invention provides an ignition flux for arc stud welding, including 30-55 wt % $SiO_2$, 30-55 wt % NiO, 10-35 wt % $AlF_3$, and 5-25 wt % $NiF_2$, or including 30-55 wt % $TiO_2$, 30-55 wt % NiO, 10-35 wt % $AlF_3$, and 5-25 wt % $NiF_2$. As such, the electric arc can be easily created and smoothly formed. The invention further provides an arc stud welding method utilizing such ignition flux. As such, the fastener and the metal workpiece can be tightly connected together without the need of inserting an ignition tip into the welding portion of a fastener.

8 Claims, 5 Drawing Sheets

(56) References Cited

FOREIGN PATENT DOCUMENTS

TW          I377106  B1     11/2012

OTHER PUBLICATIONS

English translation of JPS61111781.
English translation of JPS63295068.
English translation of JPH09108859.
English translation of TWI377106.
English translation of JPS6099486.

* cited by examiner

IGNITION FLUX FOR ARC STUD WELDING AND ARC STUD WELDING METHOD

CROSS REFERENCE TO RELATED APPLICATIONS

The application claims the benefit of Taiwan application serial No. 105108316, filed on Mar. 17, 2016, and the subject matter of which is incorporated herein by reference.

BACKGROUND OF THE INVENTION

1. Field of the Invention

The present invention generally relates to an ignition flux and a welding method and, more particularly, to an ignition flux for arc stud welding and an arc stud welding method.

2. Description of the Related Art

According to a conventional arc stud welding (or drawn arc stud welding) method, a welding portion of a fastener is positioned into contact with a welding zone of a metal workpiece. When an electric current flows through the fastener to the metal workpiece, and then the fastener is lifted from the metal workpiece, thus drawing an electric arc between the fastener and the metal workpiece. Consequently, the welding portion of the fastener and the welding zone of the metal workpiece are melted by the heat of said electric arc. Finally, a mechanical force is applied to the fastener, plunging the welding portion of the fastener into the welding zone of the metal workpiece, resulting in a welded joint. For instance, the fastener can be a screw bolt or a stud, and the metal workpiece can be a metal sheet or a metal tube.

In practice, the above described process is usually carried out with an arc stud welding machine. The arc stud welding machine includes a welding gun for holding the fastener. When such a machine is switched on, a voltage is applied to the fastener to form a current flowing from the fastener to the metal workpiece, such that the electric current flows through the fastener to the metal workpiece. A push-pull mechanism will then lifts off the fastener from the metal workpiece to draw an electric arc, consequently melting the welding portion of the fastener and the welding zone of the metal workpiece. After a predetermined arcing time, the push-pull mechanism will applied the mechanical force to plunge the fastener into a molten pool formed on the metal workpiece, forming a soundness joint connecting the fastener and the metal workpiece after the molten pool cools down. The arc stud welding process has high efficiency, and is widely used for shipbuilding, building, bridge constructions, automotive bodies, mechanical equipments, chemical equipments, and electricity equipments.

Particularly, when a fastener with a large diameter is used, it is usually required to dig a small hole at the center of its welding portion and to insert an ignition tip into said hole before drawing the electric arc for welding. Without the ignition tip, the electric arc cannot be easily created and smoothly formed, thus the fastener and the metal workpiece cannot sufficiently melt to tightly connect with each other. However, the insertion process of the ignition tip is complicated with high cost, significantly reducing welding efficiency and increasing the cost of production.

SUMMARY OF THE INVENTION

It is therefore the objective of this invention to provide an ignition flux for arc stud welding. By coating the ignition flux on a surface of a metal workpiece, a fastener can be tightly connected with the metal workpiece, without the need of inserting an ignition tip into a welding portion of the fastener.

The invention further provides an arc stud welding method which utilizes the ignition flux to tightly connect the fastener with the metal workpiece, without the need of inserting an ignition tip into a welding portion of the fastener.

The invention provides an ignition flux comprising 30-55 wt % $SiO_2$, 30-55 wt % NiO, 10-35 wt % $AlF_3$, and 5-25 wt % $NiF_2$; or the ignition flux comprises 30-55 wt % $TiO_2$, 30-55 wt % NiO, 10-35 wt % $AlF_3$, and 5-25 wt % $NiF_2$. As such, the electric arc can be easily created and smoothly formed. The fastener and the metal workpiece can be tightly connected together without the need of inserting an ignition tip into the welding portion of the fastener. Furthermore, heating temperature of the electric arc can be increased. Hence, the welding process can be simplified and strength of the welded joint can be enhanced, while welding efficiency and penetration of the weld can be improved further.

The present invention provides an arc stud welding method, including preparing a fastener having a welding portion; preparing a metal workpiece having a welding zone; coating an ignition flux onto the welding zone of the metal workpiece, with the ignition flux including 30-55 wt % $SiO_2$, 30-55 wt % NiO, 10-35 wt % $AlF_2$, and 5-25 wt % $NiF_2$, or with the ignition flux including 30-55 wt % $TiO_2$, 30-55 wt % NiO, 10-35 wt % $AlF_3$, and 5-25 wt % $NiF_2$; positioning the welding portion of the fastener in firm contact with the welding zone of the metal workpiece, and then a voltage is applied to the fastener to form a current flowing from the fastener to the metal workpiece; separating the fastener and the metal workpiece to draw an electric arc between the fastener and the metal workpiece until the welding portion of the fastener, the ignition flux, and the welding zone of the metal workpiece are melted; and applying a mechanical force to plunge the welding portion of the fastener into the welding zone of the metal workpiece. As such, the fastener can be directly connected with the metal workpiece without the need of inserting an ignition tip into the welding portion of the fastener. The complicated steps and high cost for inserting the ignition tip can be avoided, improving the welding efficiency and reducing the cost of production.

In a form shown, the arc stud welding method further comprising placing the fastener and the metal workpiece into a protective atmosphere after coating the ignition flux onto the welding zone of the metal workpiece and before providing the electric current to the fastener.

In another form shown, the arc stud welding further comprising enclosing the welding portion of the fastener and the welding zone of the metal workpiece with a ceramic ferrule after coating the ignition flux onto the welding zone of the metal workpiece and before providing the electric current to the fastener.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The present invention provides an ignition flux for arc stud welding, which includes at least 30 wt % of an active agent. The present invention further provides an arc stud welding method utilizing the ignition flux, which includes providing a fastener and a metal workpiece, coating the ignition flux onto a welding zone of the metal workpiece, providing an electric current to draw an electric arc between the fastener and the metal workpiece until a welding portion of the fastener, the ignition flux, and the welding zone of the metal workpiece are melted, and applying a mechanical force to plunge the welding portion of the fastener into the welding zone of the metal workpiece.

Specifically, the active agent of the ignition flux is selected from a group consisting of $SiO_2$ and $TiO_2$. For instance, the ignition flux can be 100% $SiO_2$ or 100% $TiO_2$. Alternatively, $SiO_2$ and $TiO_2$ can be mixed under any ratio as the active agent. Since $SiO_2$ and $TiO_2$ both have low bond dissociation energy, they can rapidly dissociate and draw electric arc when the electric current is provided. Besides, $SiO_2$ and $TiO_2$ can increase the penetration of the weld, thus improving strength of the welded joint.

In addition, the ignition flux can further include a binary compound. The term "binary compound" indicates a compound consisting of two different elements, such as NiO, $AlF_3$, and etc. Meanwhile, bond dissociation energy of the binary compound must be lower than bond dissociation energy of the active agent. In this way, the binary compound can initially dissociate when an electric current is provided, promoting dissociation of the active agent. Thus, not only the electric arc can be easily created and smoothly formed, but also the heating temperature of the electric arc can be increased. The binary compound in cooperation with the active agent can significantly improve the penetration of the weld. More specifically, the binary compound can be NiO, $AlF_3$, $NiF_2$, MnO, $Cr_2O_3$, ZnO, CoO, FeO, $Fe_2O_3$, $Fe_3O_4$, and $Cu_2O$.

In the present embodiment, the ignition flux includes 30-55 wt % $SiO_2$, 30-55 wt % NiO, 10-35 wt % $AlF_3$, and 5-25 wt % $NiF_2$; or the ignition flux includes 30-55 wt % $TiO_2$, 30-55 wt % NiO, 10-35 wt % $AlF_3$, and 5-25 wt % $NiF_2$. By using the ignition flux with such composition, the electric arc can be easily created and smoothly formed and the heating temperature of the electric arc can also be increased, thus significantly improving the penetration of the weld. The ignition flux can be in the form of particle or powder. Preferably, the ignition flux is in the form of powder with evenly distributed grain size, which can rapidly draw electric arc with high temperature.

The arc stud welding method of the present invention utilizing the ignition flux described above to connect the fastener to the metal workpiece. The fastener can be a screw bolt, stud or specially formed nut made of metal material; and the metal workpiece is usually a metal sheet or a metal tube, which is not limited in the present invention. According to needs, the fastener and the metal workpiece can be cleaned initially before welding. For instance, dirt and oil adhered to their surfaces can be washed off using a volatile solvent, and rusty spots thereon can be removed by sandblasting or polishing steps.

Figure 1:
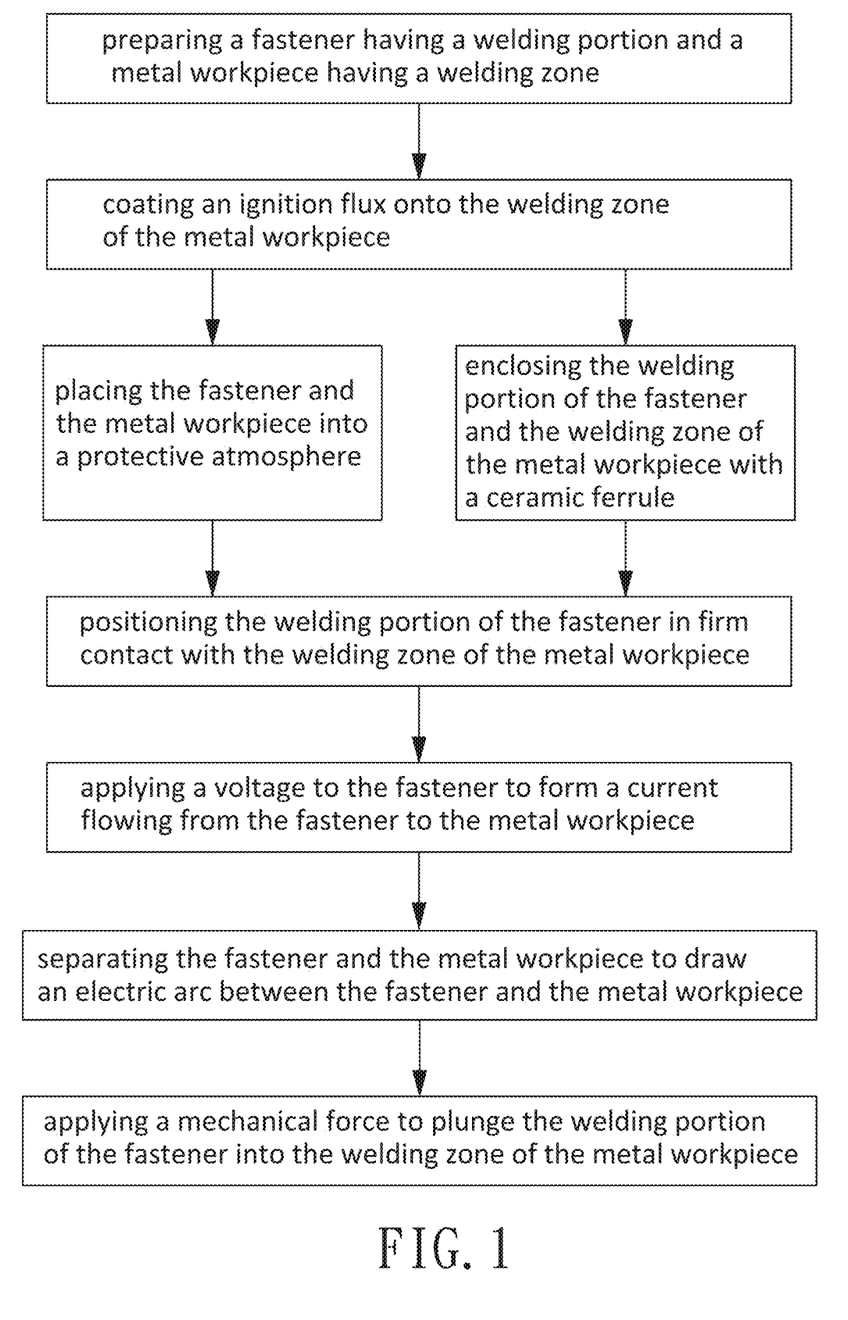
FIG. 1 is a flow chart of an arc stud welding method according to the present invention.
Figure 2:
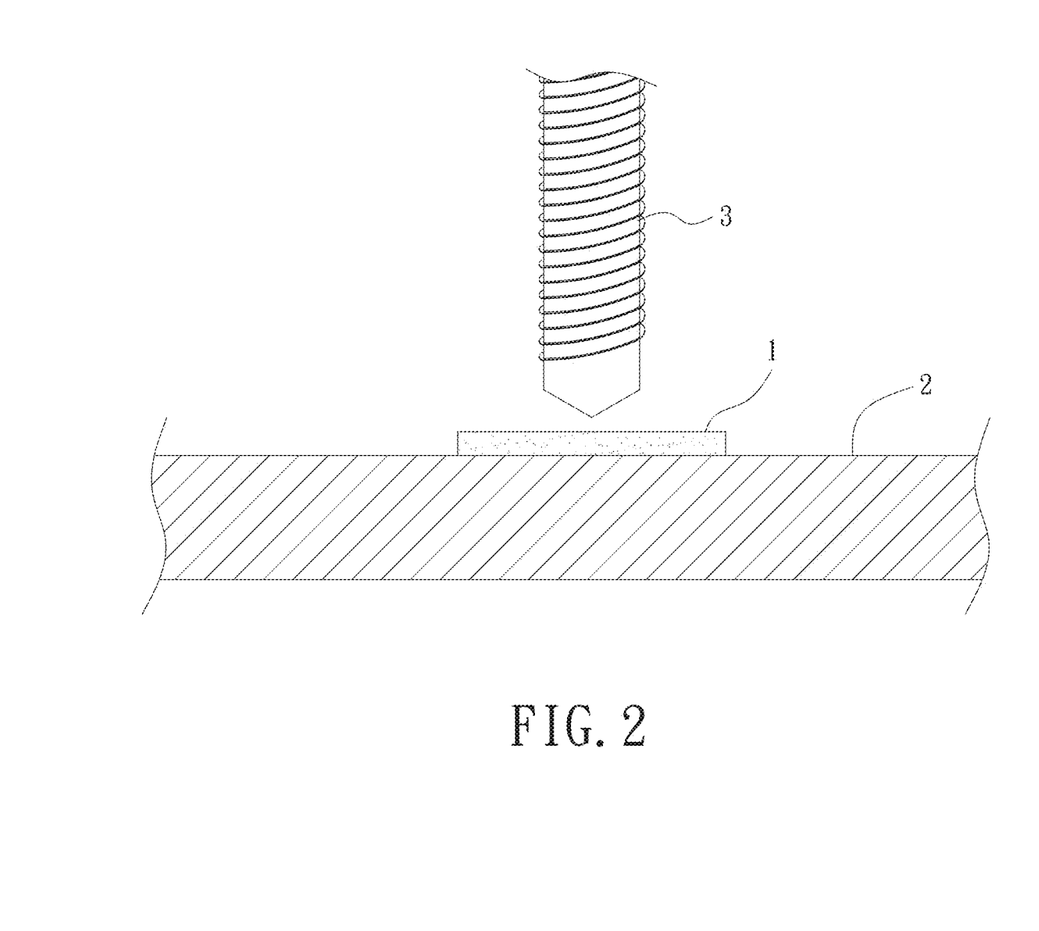
FIG. 2 illustrates the use of the ignition flux of the present invention.
Figure 3:
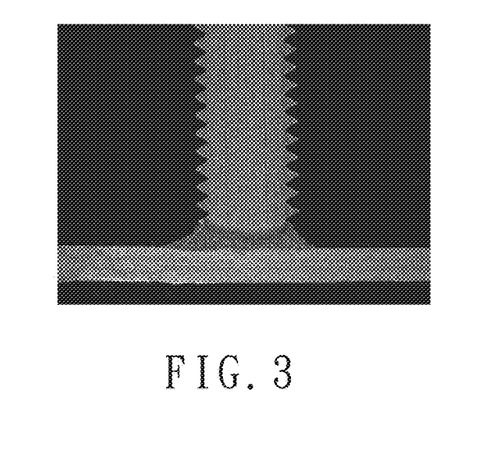
FIG. 3 is a cross-sectional view of a specimen of Group A1 (the same as Group B1).
Figure 4:
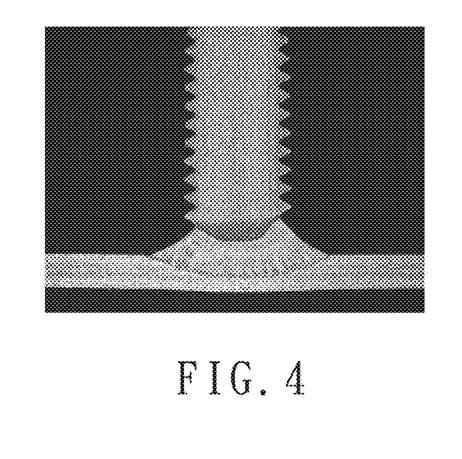
FIG. 4 is a cross-sectional view of a specimen of Group A2.
Figure 5:
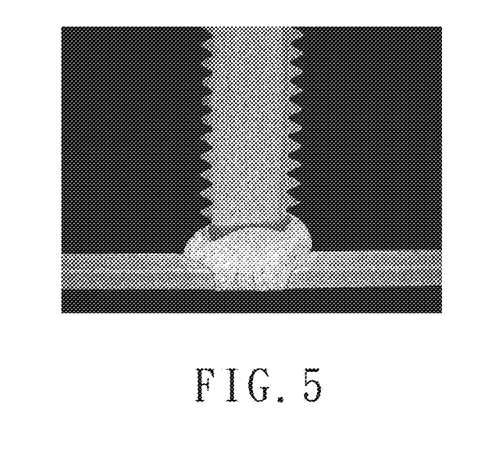
FIG. 5 is a cross-sectional view of a specimen of Group A3.
Figure 6:
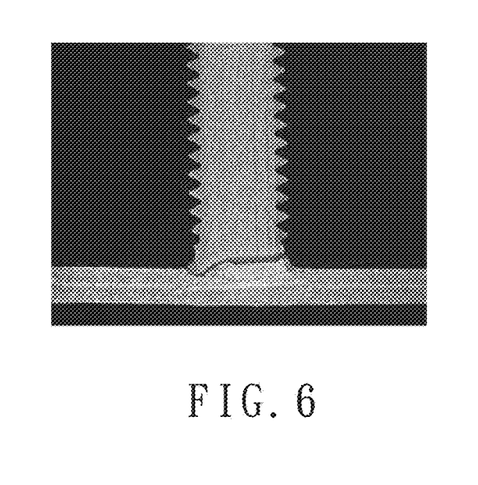
FIG. 6 is a cross-sectional view of a specimen of Group A4.
Figure 7:
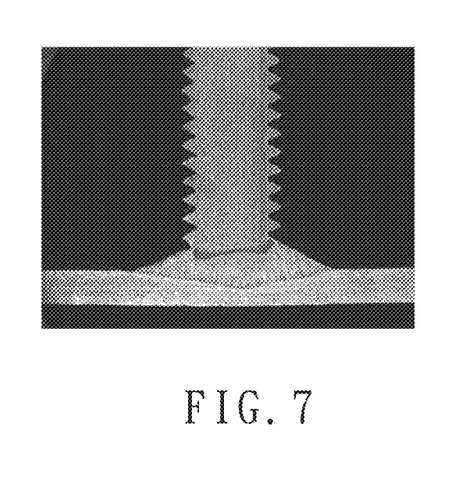
FIG. 7 is a cross-sectional view of a specimen of Group B2.
Figure 8:
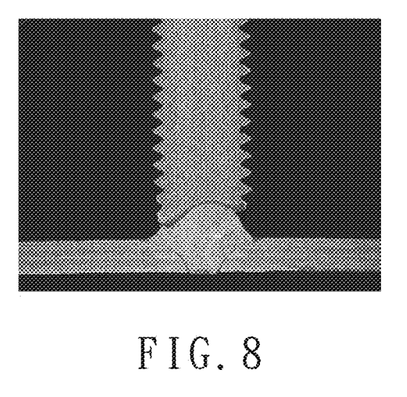
FIG. 8 is a cross-sectional view of a specimen of Group B3.
Figure 9:
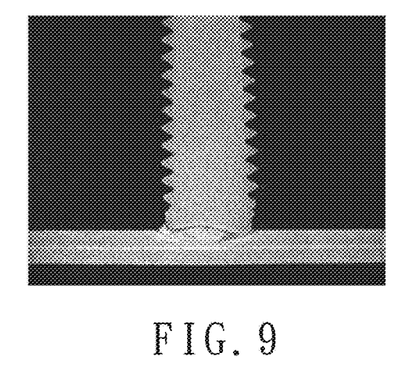
FIG. 9 is a cross-sectional view of a specimen of Group B4.

Next, as shown in FIGS. 1 and 2, the ignition flux 1 is coated onto the welding zone of the metal workpiece 2. The coated area of the ignition flux is preferably larger than the size of the welding portion of the fastener 3. When the fastener 3 is a screw bolt or a stud, the welding portion is usually a conical end thereof; and when the fastener 3 is a nut, the welding portion can be a bottom surface of the nut. Accordingly, the welding zone of the metal workpiece 2 can be a plat surface or a curved surface. The ignition flux 1 can be pre-mixed with a solvent to form a paint-like consistency and then coated onto the welding zone of the metal workpiece 2 using a brush. Alternatively, the ignition flux 1 in the powder form can be directly sprinkled on the welding zone of the metal workpiece 2.

After coating the ignition flux onto the welding zone of the metal workpiece, the welding portion of the fastener is positioned into firm contact with the welding zone of the metal workpiece, and then a voltage is applied to the fastener to form a current flowing from the fastener to the metal workpiece, such that the electric current flows through the fastener to the metal workpiece. During welding, the metal workpiece can be placed on ground or held by a rack. The fastener can be hold by a welding gun, and the electric current can be provided to the fastener through the welding gun. With the electric current provided, the fastener is moved away from the metal workpiece, such as moving or lifting the welding gun holding the fastener to adjust the distance between the fastener and the metal workpiece, thus the electric arc can be readily drawn between the welding portion of the fastener and the welding zone of the metal workpiece. Under the high temperature provided by the electric arc, the welding portion of the fastener melts into a molten pool, and the welding zone of the metal workpiece melts into another molten pool. Considering to the composition of the ignition flux and the diameter of the fastener, the factor of welding, such as the welding current, welding time and lifting distance, can be correspondingly adjusted. Thus, melting level of the fastener and the metal workpiece can be adjusted to meet different application requirements.

Next, as shown in FIG. 1, the ignition flux 1 is coated onto the welding zone of the metal workpiece 2. The coated area of said ignition flux is preferably larger than the size of the welding portion of the fastener 3. When the fastener 3 is a screw bolt or a stud, the welding portion is usually a conical end thereof; and when the fastener 3 is a nut, the welding portion can be a bottom surface of said nut. Accordingly, the welding zone of the metal workpiece 2 can be a plat surface or a curved surface. The ignition flux 1 can be pre-mixed with a solvent to form a paint-like consistency and then coated onto the welding zone of the metal workpiece 2 using a brush. Alternatively, the ignition flux 1 in the powder form can be directly sprinkled on the welding zone of the metal workpiece 2.

After coating the ignition flux onto the welding zone of the metal workpiece, the welding portion of the fastener is positioned into firm contact with the welding zone of the metal workpiece, and then a voltage is applied to the fastener to form a current flowing from the fastener to the metal workpiece, such that the electric current flows through the fastener to the metal workpiece. During welding, the metal workpiece can be placed on ground or held by a rack. The fastener can be hold by a welding gun, and the electric current can be provided to the fastener through said welding gun. With the electric current provided, the fastener is moved away from the metal workpiece, such as moving or lifting the welding gun holding the fastener to adjust the distance between the fastener and the metal workpiece, thus the electric arc can be readily drawn between the welding portion of the fastener and the welding zone of the metal workpiece. Under the high temperature provided by the electric arc, the welding portion of the fastener melts into a molten pool, and the welding zone of the metal workpiece melts into another molten pool. Considering to the composition of the ignition flux and the diameter of the fastener, the factor of welding, such as the welding current, welding time and lifting distance, can be correspondingly adjusted. Thus, melting level of the fastener and the metal workpiece can be adjusted to meet different application requirements.

When both the welding portion of the fastener and the welding zone of the metal workpiece are melted, these two molten pools are positioned into contact with each other. A mechanical force is applied to plunge the fastener to the metal workpiece, such that the two molten pools fuse together. After the molten pool cools down, the welding portion of the fastener is tightly connected to the welding zone of the metal workpiece. For instance, the welding gun moves the fastener into contact with the metal workpiece and applies a mechanical force to tightly connect the fastener with the metal workpiece.

During the welding described above, after the ignition flux is coated onto the welding zone of the metal workpiece, the metal workpiece and the fastener can be placed into a protective atmosphere, and the afterward steps can be carried out under the protective atmosphere, such that oxidation of the fastener and the metal workpiece due to high temperature during welding can be avoided. Alternatively, after coating the ignition flux, a ceramic ferrule can be utilized to enclose the welding portion of the fastener and the welding zone of the metal workpiece, and the afterward steps can be carried out with the ceramic ferrule positioned. Similarly, the use of the ceramic ferrule can prevent oxidation of the fastener and metal workpiece due to high temperature during welding.

By utilizing the ignition flux, the fastener can be directly connected with the metal workpiece without the need of inserting an ignition tip into the welding portion of the fastener. Thus, welding efficiency can be improved, and the cost of production can be reduced. Besides, in the arc stud welding method, by using the ignition flux, the electric arc can be easily created and smoothly formed with high temperature, significantly improving the penetration of the weld.

The following experiments are carried out to confirm that the ignition flux of the present invention can certainly improve the penetration of the weld.

(A) Using $SiO_2$ as the Active Agent

In the present experiment, $SiO_2$ is selected as the active agent, and the ignition flux of Groups A2-A4 are prepared according to the compositions shown in Table 1. The ignition fluxes of Groups A2-A4 are tested using the arc stud welding method of the present invention, and Group A1 presents the same process without ignition flux. In the present experiment, M6 stud is used as the fastener, and stainless steel sheet with a thickness of 2 mm is used as the metal workpiece. The arc stud welding is carried out using an arc stud welding machine, with the welding current of 300 A, the welding time is set at 0.4 sec, and the lifting distance is kept at 2 mm. After welding, the specimens of Groups A1-A4 are cut at a section passing through the axis of the welded joint. All samples are then mounted, ground, polished and etched. The welded joint profiles of Groups A1-A4 are photographed using a stereo microscope, and the results are shown in FIGS. 3-6, respectively.

TABLE 1

The compositions of the ignition flux were used in Groups A1-A4.

| Group | Composition of Ignition Flux (%) | | | |
|---|---|---|---|---|
| | $SiO_2$ | NiO | $AlF_3$ | $NiF_2$ |
| Group A1 | — | — | — | — |
| Group A2 | 100 | — | — | — |
| Group A3 | 35 | 35 | 20 | 10 |
| Group A4 | 20 | 40 | 25 | 15 |

As can be seen in FIGS. 3-6, Group A1 (FIG. 3), which uses no ignition flux, shows low penetration of the weld, indicating the welded joint with insufficient strength. Group A2 (FIG. 4), which uses 100% $SiO_2$ as the ignition flux, significantly increases the penetration of the weld and can be readily used in practice. Group A3 (FIG. 5), which uses 35% $SiO_2$ with the binary compounds, shows a further improved the penetration of the weld, dramatically increasing the strength of the welded joint. Group A4 (FIG. 6), which uses $SiO_2$ with a concentration lower than 30%, fails to significantly increase the penetration of the resultant weld.

(B) Using $TiO_2$ as the Active Agent

Similar to the Experiment (A), the present experiment uses $TiO_2$ as the active agent, and the ignition flux of Groups B2-B4 are prepared according to the composition shown in Table 2. The ignition fluxes of Groups B2-B4 are tested using the arc stud welding method of the present disclosure, and Group B1 presents the same process without ignition flux. The setting of the present experiment is the same as Experiment (A). After welding, the specimens of Groups B1-B4 are cut at a section passing through the axis of the welded joint. All samples are then mounted, ground, polished and etched. The welded joint profiles of Groups B1-B4 are photographed using a stereo microscope, and the results are shown in FIGS. 3 and 7-9, respectively.

TABLE 2

The compositions of the ignition flux were used in Groups B1-B4.

| Group | Composition of Ignition Flux (%) | | | |
|---|---|---|---|---|
| | $TiO_2$ | NiO | $AlF_3$ | $NiF_2$ |
| Group B1 | — | — | — | — |
| Group B2 | 100 | — | — | — |
| Group B3 | 35 | 35 | 20 | 10 |
| Group B4 | 20 | 40 | 25 | 15 |

Similarly, as can be seen in FIGS. 3 and 7-9, Group B1 (FIG. 3), which uses no ignition flux, shows low penetration of the weld, indicating the welded joint with insufficient strength. Group B2 (FIG. 7), which uses 100% $TiO_2$ as the ignition flux, significantly increases the penetration of the weld and can be readily used in practice. Group B3 (FIG. 8), which uses 35% $TiO_2$ with the binary compounds, shows a further improved the penetration of the weld, dramatically increasing the strength of the welded joint. Group B4 (FIG. 9), which uses titanium oxide with a concentration lower than 30%, fails to significantly increase the penetration of the resultant weld.

(C) The Effect of the Current Intensity

Among the groups which use no ignition flux, comparing the group using the welding current of 300 A (Group A1, FIG. 3) with the group using the welding current of 400 A (Group C1, FIG. 10), it can be seen that increasing current intensity can only slightly improve the penetration of the weld but still cannot comply with the basic requirement of welding quality. Among the groups which utilize ignition flux, comparing the group using the welding current of 300 A (Groups A3 and C3, FIGS. 5 and 9) with the group using the welding current of 400 A (Groups C2 and C3, FIGS. 11 and 12), it can be seen that increasing current intensity can adjust the penetration of the weld to meet different application requirements.

Figure 10:
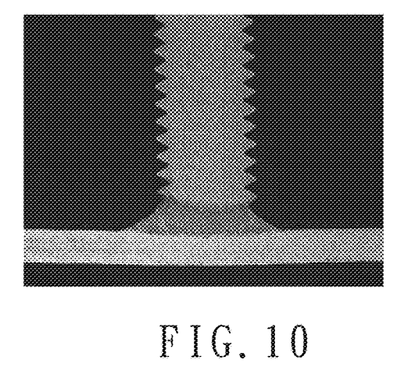
FIG. 10 is a cross-sectional view of a specimen of Group C1.
Figure 11:
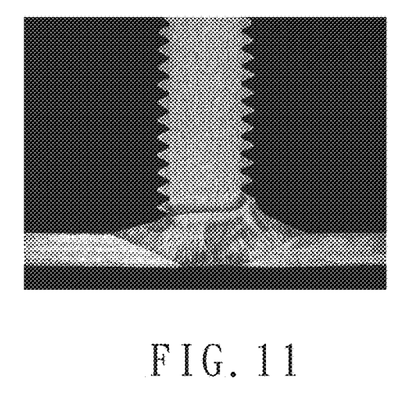
FIG. 11 is a cross-sectional view of a specimen of Group C2.
Figure 12:
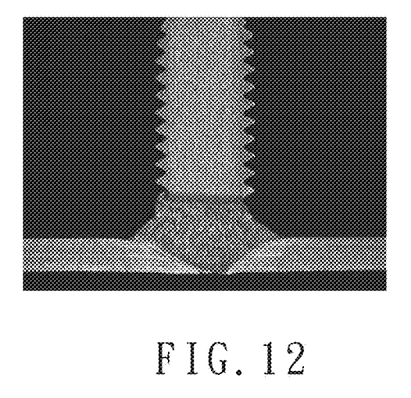
FIG. 12 is a cross-sectional view of a specimen of Group C3.
Figure 13:
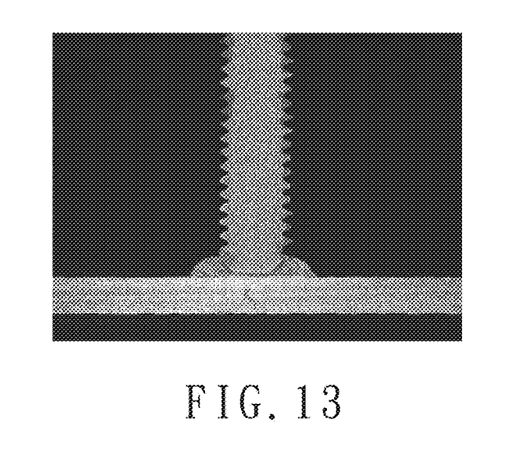
FIG. 13 is a cross-sectional view of a specimen of Group D1.
Figure 14:
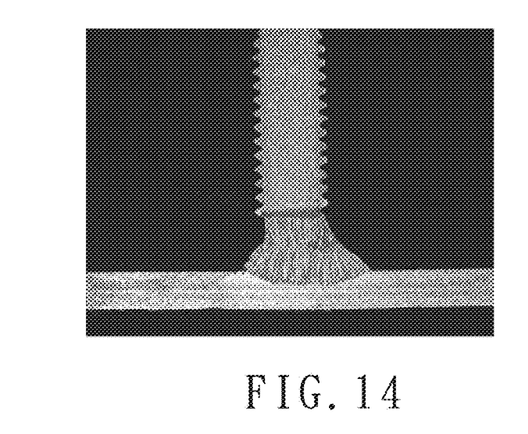
FIG. 14 is a cross-sectional view of a specimen of Group D2.
Figure 15:
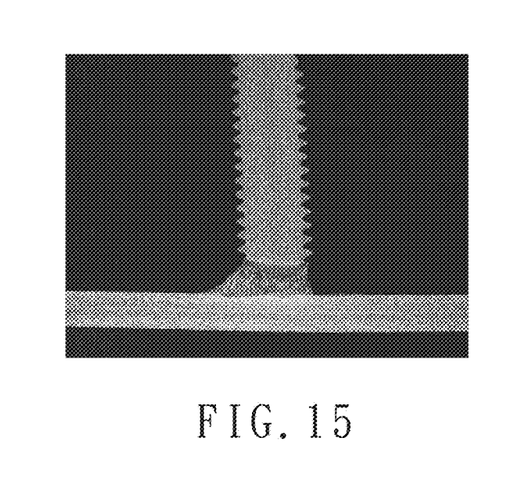
FIG. 15 is a cross-sectional view of a specimen of Group D3.
Figure 16:
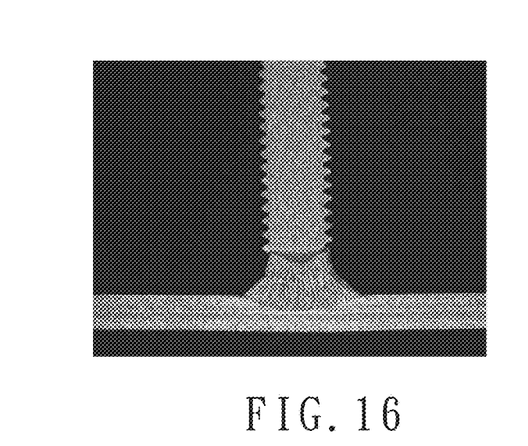
FIG. 16 is a cross-sectional view of a specimen of Group D4.

Group C1, which uses no ignition flux, is viewed as a controlled group. The ignition flux of Group A3 described above is taken as the ignition flux of Group C2 in the present experiment, and the ignition flux of Group B3 described above is taken as the ignition flux of Group C3 in the present experiment. The ignition fluxes of Groups C2 and C3 are tested using the arc stud welding method of the present invention, and Group C1 presents the same process without ignition flux. In this experiment, the welding current is set at 400 A, with the other factors being the same as Experiment (A). After welding, the specimens of Groups C1-C3 are cut at a section passing through the axis of the welded joint. All samples are then mounted, ground, polished and etched. The welded joint profiles of Groups C1-C3 are photographed using a stereo microscope, and the results are shown in FIGS. 10-12, respectively.

(D) The Effect of the Fastener Size and the Current Intensity

In the present experiment, Groups D1 and D3, which use no ignition flux, are viewed as controlled groups. The ignition flux of Group A3 described above is used in Groups D2 and D4 of the present experiment. M4 stud is used as the fastener, with the welding current of Groups D1 and D2 is set at 250 A, with the welding current of Groups D3 and D4 is set at 300 A, and with the other factors being the same as Experiment (A). The compositions of the ignition flux and the current intensities used in Groups D1-D4 are shown in Table 3. After welding, the specimens of Groups D1-D4 are cut at a section passing through the axis of the welded joint. All samples are then mounted, ground, polished and etched. The welded joint profiles of Groups D1-D4 are photographed using a stereo microscope, and the results are shown in FIGS. 13-16, respectively.

TABLE 3

The compositions of the ignition flux and the current intensities were used in Groups D1-D4.

| Group | Composition of Ignition Flux | Current Intensity |
|---|---|---|
| Group D1 | using no ignition flux | 250 A |
| Group D2 | the same as Group A3 | 250 A |
| Group D3 | using no ignition flux | 300 A |
| Group D4 | the same as Group A3 | 300 A |

As can be seen in the experimental results, under the welding current of 250 A, the group using no ignition flux (Group D1, FIG. 13) shows low penetration of the weld, indicating the welded joint with insufficient strength. On the other hand, the group using the ignition flux (Group D2, FIG. 14) shows sufficient penetration of the weld. Similarly, under the welding current of 300 A, although the increased current intensity can increased the penetration of the weld of the group using no ignition flux (Group D3, FIG. 15), the penetration of the weld thereof still cannot reach the level of the penetration of the weld of the group using the ignition flux (Group D4, FIG. 16). According to the above, the ignition flux of the present invention can certainly improves the penetration of the weld and decreases the current intensity requirement of the arc stud welding.

In light of the above, since the ignition flux for arc stud welding of the present invention includes at least 30 wt % of the active agent and uses $SiO_2$, $TiO_2$ or the combination thereof as the active agent, the electric arc can be easily created and smoothly formed with improved the heating temperature. Hence, the fastener and the metal workpiece can be tightly connected together without the need of inserting an ignition tip into the welding portion of the fastener. As such, the welding efficiency is improved, and the penetration of the weld is increased.

Besides, since the ignition flux for arc stud welding includes the binary compound with bond dissociation energy lower than bond dissociation energy of the active agent, the electric arc can be drawn even faster, further improving the welding efficiency.

Furthermore, since the arc stud welding method of the present invention coats the welding zone of the metal workpiece with the ignition flux, the fastener can be tightly connected with the metal workpiece without the need of inserting a ignition tip into the welding portion of a fastener. Hence, the complicated steps and cost of ignition tip insertion can be avoided, improving the welding efficiency and reducing the cost of production.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. An ignition flux for arc stud welding, comprising 30-55 wt % $SiO_2$, 30-55 wt % NiO, 10-35 wt % $AlF_3$, and 5-25 wt % $NiF_2$.

2. An ignition flux for arc stud welding, comprising 30-55 wt % $TiO_2$, 30-55 wt % NiO, 10-35 wt % $AlF_3$, and 5-25 wt % $NiF_2$.

3. An arc stud welding method, comprising:
preparing a fastener having a welding portion;
preparing a metal workpiece having a welding zone;
coating an ignition flux onto the welding zone of the metal workpiece, wherein the ignition flux comprises 30-55 wt % $SiO_2$, 30-55 wt % NiO, 10-35 wt % $AlF_3$, and 5-25 wt % $NiF_2$;
positioning the welding portion of the fastener in firm contact with the welding zone of the metal workpiece, and then a voltage is applied to the fastener to form a current flowing from the fastener to the metal workpiece;
separating the fastener and the metal workpiece to draw an electric arc between the fastener and the metal workpiece until the welding portion of the fastener, the ignition flux, and the welding zone of the metal workpiece are melted; and
applying a mechanical force to plunge the welding portion of the fastener into the welding zone of the metal workpiece.

4. An arc stud welding method, comprising:
preparing a fastener having a welding portion;
preparing a metal workpiece having a welding zone;
coating an ignition flux onto the welding zone of the metal workpiece, wherein the ignition flux comprises 30-55 wt % $TiO_2$, 30-55 wt % NiO, 10-35 wt % $AlF_3$, and 5-25 wt % $NiF_2$;
positioning the welding portion of the fastener in firm contact with the welding zone of the metal workpiece, and then a voltage is applied to the fastener to form a current flowing from the fastener to the metal workpiece;
separating the fastener and the metal workpiece to draw an electric arc between the fastener and the metal workpiece until the welding portion of the fastener, the ignition flux, and the welding zone of the metal workpiece are melted; and
applying a mechanical force to plunge the welding portion of the fastener into the welding zone of the metal workpiece.

5. The arc stud welding method as claimed in claim 4, further comprising placing the fastener and the metal workpiece into a protective atmosphere after coating the ignition flux onto the welding zone of the metal workpiece and before providing the electric current to the fastener.

6. The arc stud welding method as claimed in claim 4, further comprising enclosing the welding portion of the fastener and the welding zone of the metal workpiece with a ceramic ferrule after coating the ignition flux onto the welding zone of the metal workpiece and before providing the electric current to the fastener.

7. The arc stud welding method as claimed in claim 3, further comprising placing the fastener and the metal workpiece into a protective atmosphere after coating the ignition flux onto the welding zone of the metal workpiece and before providing the electric current to the fastener.

8. The arc stud welding method as claimed in claim 3, further comprising enclosing the welding portion of the fastener and the welding zone of the metal workpiece with a ceramic ferrule after coating the ignition flux onto the welding zone of the metal workpiece and before providing the electric current to the fastener.

* * * * *